US009126389B2

(12) United States Patent
Brown

(10) Patent No.: US 9,126,389 B2
(45) Date of Patent: Sep. 8, 2015

(54) ARTICLE COMPRISING POLYESTER MULTILAYER FILM

(75) Inventor: Michael Joseph Brown, Wilmington, DE (US)

(73) Assignee: DUPONT TEIJIN FILMS U.S. LIMITED PARTNERSHIP, Chester, VA (US)

( * ) Notice: Subject to any disclaimer, the term of this patent is extended or adjusted under 35 U.S.C. 154(b) by 1297 days.

(21) Appl. No.: 11/157,617

(22) Filed: Jun. 21, 2005

(65) Prior Publication Data

US 2005/0282025 A1  Dec. 22, 2005

Related U.S. Application Data

(60) Provisional application No. 60/581,420, filed on Jun. 21, 2004.

(51) Int. Cl.
*B32B 27/36* (2006.01)
*B32B 7/02* (2006.01)
*B32B 27/08* (2006.01)
*C08G 63/688* (2006.01)
*C08L 67/02* (2006.01)

(52) U.S. Cl.
CPC . *B32B 27/36* (2013.01); *B32B 7/02* (2013.01); *B32B 27/08* (2013.01); *C08G 63/6886* (2013.01); *C08L 67/02* (2013.01); *Y10T 428/31725* (2015.04)

(58) Field of Classification Search
CPC .......... B32B 27/36; B32B 7/02; B32B 27/08; Y10T 428/31725; C08G 63/6886; C08L 67/02
See application file for complete search history.

(56) References Cited

U.S. PATENT DOCUMENTS

| | | | | |
|---|---|---|---|---|
| 3,563,942 A | * | 2/1971 | Heiberger | 524/602 |
| 3,779,993 A | * | 12/1973 | Kibler et al. | 528/295 |
| 3,997,677 A | | 12/1976 | Hirsch et al. | |
| 4,104,262 A | * | 8/1978 | Schade | 528/295 |
| 4,217,441 A | * | 8/1980 | Bayless | 528/293 |
| 4,452,942 A | * | 6/1984 | Shida et al. | 525/74 |
| 4,493,872 A | | 1/1985 | Funderburk et al. | |
| 4,654,240 A | * | 3/1987 | Johnston | 206/524.6 |
| 4,996,086 A | | 2/1991 | Gerlowski et al. | |
| 5,073,435 A | | 12/1991 | Eyraud et al. | |
| 5,164,248 A | * | 11/1992 | Fleury et al. | 428/220 |
| 5,466,519 A | * | 11/1995 | Shirakura et al. | 428/323 |
| 5,843,501 A | | 12/1998 | Rubin et al. | |
| 6,274,246 B1 | * | 8/2001 | Eggers et al. | 428/474.4 |
| 6,346,285 B1 | | 2/2002 | Ramesh | |
| 6,368,710 B1 | * | 4/2002 | Hayes | 428/364 |
| 6,383,627 B2 | * | 5/2002 | Hashimoto et al. | 428/332 |
| 6,417,262 B1 | * | 7/2002 | Turner et al. | 524/445 |
| 2001/0036518 A1 | * | 11/2001 | Wright et al. | 428/34.2 |
| 2002/0068158 A1 | | 6/2002 | Peiffer et al. | |
| 2002/0114890 A1 | * | 8/2002 | Posey et al. | 427/385.5 |
| 2002/0160129 A1 | | 10/2002 | Piper et al. | |
| 2003/0021870 A1 | * | 1/2003 | Pollok et al. | 426/412 |

FOREIGN PATENT DOCUMENTS

| | | |
|---|---|---|
| BR | 8406094 | 9/1985 |
| CA | 2 452 995 A1 | 6/2004 |
| EP | 0 306 675 A2 | 3/1989 |
| EP | 1 526 093 A2 | 4/2005 |
| GB | 1337331 | 11/1973 |
| JP | 02135259 A | 5/1990 |
| JP | 4051423 B | 8/1992 |
| JP | 5043584 B | 7/1993 |
| JP | 2000/108282 A | 4/2000 |
| WO | WO 99/58328 * | 5/1999 |
| WO | WO 0112678 A1 * | 2/2001 |
| WO | WO 01/54886 A1 | 8/2001 |
| WO | 03033258 | 4/2003 |

OTHER PUBLICATIONS

The American Heritage® Dictionary of the English Language. Fourth Ed. Entry for "contact". http://www.bartleby.com/61/49/C0594900.html (Retrieved Jan. 22, 2009).*
PCT International Search Report for International Application PCT/US2005/022112 dated Oct. 21, 20005.
Brazilian Office Action mailed Apr. 7, 2015 in Brazilian Application No. PI 0511412-8.

* cited by examiner

*Primary Examiner* — Callie Shosho
*Assistant Examiner* — John Freeman
(74) *Attorney, Agent, or Firm* — RATNERPRESTIA

(57) ABSTRACT

Articles comprising multilayer coextruded films having polyester and polyamide layers adhered with a copolymer of polyester and a sulfonic acid or its derivative, having high oxygen barrier properties and temperature resistance that are capable of being heated to 425° F. in a conventional oven are disclosed. The articles are packages, such as bags, pouches, and casings that are particularly useful for packaging and cooking foodstuffs such as meat, poultry, seafood and the like.

21 Claims, No Drawings

ARTICLE COMPRISING POLYESTER MULTILAYER FILM

The invention claims the priority to the U.S. provisional application Ser. No. 60/581,420, filed Jun. 21, 2004, the entire disclosure of which is incorporated herein by reference.

This invention relates to an article including package and comprising a multilayer film comprising polyester.

BACKGROUND OF THE INVENTION

Articles such as food items such as specifically meat, poultry and seafood products are often packaged in thermoplastic films or laminates in order to protect the product to be packaged from exterior abuse and environmental contamination, and to provide a convenient and durable package for distribution of the product and display in a display case or other point of sale. For several years, the food packaging industry has also used packaging films from which bags and casings have been made that are of improved structural soundness such that they have been fully characterized as "cook-in." These packages allow for production of a precooked food product that has been attractively packaged using a film within which the product was precooked. The films have been used primarily for cook-and-ship end-use, wherein a meat product is packaged in the film and cooked while in the film, and is thereafter cooled and shipped to wholesaler, retailer, or consumer, without being over wrapped and without having the film stripped therefrom and thereafter being re-packaged in another film.

Cook-in packaged foods are essentially pre-packaged, pre-cooked foods that may be directly transferred to the consumer in this form. Cook-in packaging materials maintain seal integrity, i.e., any heat-sealed seams should resist being pulled apart during cook-in, and are typically conformable to the contained food product. For example, conformability is achieved by the film being heat shrinkable so as to form a tightly fitting package. Additional desirable characteristics of films for use in cook-in applications include delamination-resistance, low $O_2$-permeability, heat-shrinkability, and optical clarity. When dealing with meat products in particular, it is usually desirable to provide a film having good oxygen barrier characteristics, in order to reduce the passage of oxygen through the film so that detrimental effects on freshness, color, and other properties of the meat product are minimized.

Cook-in films preferably have a tendency for adhesion to the food product thereby preventing "cook-out", i.e., "purge". This meat adhesion characteristic of the meat contact layer serves to both prevent cook-out (and thereby prevent an unattractive package or the need to strip the film from the meat and repackage the meat), to increase product yield, and to prevent the meat from losing juices which improve its edible character. The term "adhere", with respect to meat-adhesion, refers to a meat-contact surface of the film which bonds during cook-in to the contained food product to an extent sufficient to substantially prevent accumulation of fluids between the film and the contained meat product. See, e.g., U.S. Pat. No. 6,346,285 and U.S. Patent Application 2002/0160129.

It is desirable to provide a package for foodstuffs comprising a film with increased heat resistance, allowing for heating at higher temperatures while maintaining seal quality and barrier properties. Such packages are suitable for heating or cooking in conventional, convection or microwave ovens ("dual-ovenable") or for heating in boiling water. The convenience of being able to purchase a fresh, partially cooked or value-added foodstuff in a package at the retail level and be able to insert the package directly into a conventional oven or microwave and cook the foodstuff in the package is highly desirable.

Polyethylene terephthalate (PET) films have high heat resistance, making them suitable for cook-in and ovenable uses. Such films provide strength and protection, though they typically have the drawback that they are sealed with an adhesive since polyester is not heat-sealable except at exceptionally high temperatures. Packages (such as bags) sealed with adhesive are generally not as strong in the seal area as heat-sealed packages, and cannot be closed on the open end by existing heat-seal equipment. It is desirable to provide a package with high heat resistance and low $O_2$-permeability that can be heat sealed by existing heat-seal equipment. Other desirable attributes include puncture-resistance from internal or external puncture sources, ability to withstand freezer temperatures of –40° F., heat-shrinkability, ability to be self-venting (venting during cooking by temperature dependent processes), and optical clarity. These attributes can be achieved by using coextruded multilayer film structures having polyester-based copolymers. See, e.g., Japanese Patents JP2663578B2, JP4051423B, and JP5043584B.

SUMMARY OF THE INVENTION

The invention includes an article comprising or produced from a coextruded multilayer film having an oxygen permeability of less than 2 cc/100 inches$^2$ in 24 hours and being capable of being heated to 425° F. in a conventional oven and the article can be a package including bag, pouch, or both; casing; or other converted film product. The article can have polyester sealed to polyester. The polyester sealant may optionally have a Tg below 65° C.

The film can comprise or be produced from (A) a first layer comprising a blend of a first polyester and a sulfur-containing polyester; a second layer comprising a polyamide; and optionally a barrier layer;

(B) a first layer comprising a first polyester; a second layer comprising a blend or a sulfur-containing polyester; a third layer comprising a polyamide; and optionally a barrier layer; or (C) a first layer comprising a sulfur-containing polyester; a second layer that comprises a polyamide; optionally a barrier layer;

each film optionally comprises a sealant layer;

the blend or the sulfur-containing polyester comprises from about 0.01 to about 5 mol % of units derived from a sulfonic acid or its derivative based on the total amount of acid moieties present in the blend;

the first polyester has a softening point of from about 50° C. to a melting point of about 255° C.;

the sulfur-containing polyester comprises repeat units derived from a sulfonic acid or its derivative and the sulfur-containing polyester is optionally adhered between the layer comprising polyester and the layer comprising polyamide;

the sulfonic acid is sulfobenzenedicarboxylic acid and the derivative is a salt of the sulfonic acid, an ester of the sulfonic acid, an ester of the salt of the sulfonic acid, or combinations of two or more thereof;

the optional layer comprises or is produced from at least one polymer including ethylene/vinyl alcohol copolymer, polyamide, polyvinylidene chloride, polyalkylene carbonate, or combinations of two or more thereof; and the sealant layer optionally has a Tg below 65° C.

In the film disclosed above, the indefinite article "a" is not the same as "one" and can be more than one. The term "first", "second", or "third", etc., is for easy identification, which does not mean the order of the layer, and each can include more than one.

DETAILED DESCRIPTION OF THE INVENTION

The package can be used for packaging a wide variety of foodstuffs such as meat products and additional ingredients may be pre-cooked or ready-to-cook by the consumer. The product may be refrigerated or frozen, and the package provides a refrigerated shelf life of at least ten days. The packaged product may be taken from the refrigerator or freezer and placed directly in a conventional, convection or microwave oven for heating the foodstuff by the consumer without removing the packaging material. Depending on the sealant combinations, the package may be vented prior to heating or may be self-venting.

The sulfobenzenedicarboxylic acid comonomer units in the sulfur-containing polyester can be in the form of a salt with one or more alkali, alkali metal or metal counterions such as calcium, zinc or sodium counterion. The sulfobenzenedicarboxylic acid comonomer can be present in an amount from 0.05 to 2.5 mol % of the copolymer.

The optional layer (c) can be an oxygen-barrier layer. The barrier layer may comprise a single polymeric material or may comprise a blend of two or more materials such as nanocomposites of the barrier materials that provide improved moisture vapor transmission rates.

In one embodiment, multilayer film can comprise (1) at least one layer comprising the first polyester; (2) the second layer can comprise the first polyamide or a blend of amorphous and semicrystalline polyamides; (3) a sulfur-containing polyester layer comprising repeat units derived from about 0.01 to about 5 mol % of a sulfonic acid comonomer or its derivative; and (4) at least one optional layer that comprises at least the polymeric including ethylene/vinyl alcohol copolymer, polyester, polyester copolymer, polyamide, polyamide copolymer, polyvinylidene chloride, polyalkylene carbonate, an amorphous polyamide, or combinations of two or more thereof. Layer (4) can be an $O^2$-barrier layer and/or a sealant layer.

The sulfobenzenedicarboxylic acid comonomer can be in the form of a salt with one or more alkali, alkali metal or metal counterion such as calcium, zinc, lithium, sodium, or combinations of two or more thereof. The comonomer can be present in an amount from 0.05 to 2.5 mol % of the copolymer.

In preferred embodiments, the polyamide layer comprises or produced from polyamide 6 and at least one polyamide selected from the group consisting of polyamide 6,6, polyamide 6,10, polyamide 6,12, polyamide 6I, polyamide 6T, polyamide 6I,6T, polyamide 6,9, and copolyamides and nanocomposites thereof. The polyamide layer may also include one or more polyamide nanocomposites such as those available commercially under the tradename Aegis™ from Honeywell or Imperm™ MXD6 from Mitsubishi Gas Chemicals/Nanocor. Nanocomposites are well known to one skilled in the art and are commercially available, the description of which is omitted herein for the interest of brevity. The polyamide layer may comprise polyamide 6 in an amount of from about 40 to 90 weight %, and an aromatic or partially aromatic polyamide selected from polyamide 6I,6T or polyamide MXD6.

The multilayer film can be biaxially oriented to provide embodiments that are shrink (shrinkable) films. The film may have a free shrink at 185° F. of at least 10% in one direction or both directions.

The article can be a package in the form of bag, pouch, casing, or other converted film product comprising a multilayer film disclosed herein. The bag can be an end-seal bag or a side seal bag and the package can be in the form of a thermoformed pouch with a lidding film.

A packaged product can comprise a package and a product in the package. The package comprises the multilayer film disclosed herein. The product can comprise a foodstuff (e.g., cooked meat) within the package. "Package" refers to packaging materials configured around a product being packaged and "packaged product" refers to the combination of a product that is surrounded by a packaging material.

"Cook-in" refers to the process of cooking a product packaged in a material capable of withstanding exposure to long and slow cooking conditions while containing the food product, for example 57° C. to 121° C. (135° F. to 250° F.) for 2 to 12 hours, or by submersion in water at 57° C. to 100° C. (135° F. to 212° F.) for 2 to 12 hours. Cook-in packaged foods are essentially pre-packaged, precooked foods that may be directly transferred to the consumer in this form. These types of foods may be consumed with or without warming. Cook-in packaging materials maintain seal integrity, and in the case of multilayer films are delamination resistant at the cook-in temperatures. Cook-in films may have a tendency for adhesion to the food product, thereby preventing "cook-out", which is the collection of juices between the outer surface of the food product and the meat-contact surface of the film, i.e., the surface in direct contact with the meat. Additional optional characteristics of films for use in cook-in applications include, low oxygen permeability, heat-shrinkability representing about 20-50% biaxial shrinkage at about 85° C. (185° F.), and optical clarity. For hermetically sealed bags, it is preferred that the external surface of the package is subject to a temperature of at least about 150° F., or from about 150° F. to 212° F., about 160° F. to 212° F., about 165° F. to 200° F., or about 170° F. to 180° F.

"Ovenable" refers to the being capable of being cooked in an oven cooking (product packaged) in a material capable of withstanding exposure to cooking conditions while containing the product, e.g., at temperatures ranging from 120° C. to 220° C. (250° F. to 425° F.) for 1 to 12 hours, from 120° C. to 175° C. (250° F. to 350° F.) for 3 to 12 hours, or from 175° C. to 220° C. (350° F. to 425° F.) for 1 to 3 hours. The term "dual-ovenable" refers to the process of cooking a product packaged in a material capable of withstanding temperatures up to 220° C. (425° F.) in a conventional oven, 205° C. (400° F.) in a convection oven, or heating or cooking in a microwave oven.

The term "film" generically include plastic web, can be film or sheet and may have a thickness of 0.25 mm or less. "Lay-flat film" refers to a film that has been extruded as a wide, thin-walled, circular tube, usually blown, cooled, then gathered by converging sets of rollers and wound up in flattened form and "lay-flat width" refers to half of the circumference of the inflated film tube. A film may be produced by casting from a flat die onto a chilled roll.

The term "seal" refers to any seal of a first region of a film surface to a second region of a film surface, where the seal is formed by heating the regions to at least their respective seal initiation temperatures. The sealing can be performed by any one or more of a variety of manners, such as using a heated bar, hot air, hot wire, infrared radiation, ultrasonic sealing, radio frequency sealing, etc. A sealing mechanism may be a seal made on a bag machine using a hot wire.

"Oriented" refers to a polymer-containing material that has been elongated (generally at an elevated temperature, the orientation temperature), followed by being "set" in the elongated configuration by cooling the material while substantially retaining the elongated dimensions. This combination of elongation and cooling causes an alignment of the polymer chains to a more parallel configuration, thereby improving the mechanical properties of the film. Upon subsequently heating unrestrained, non-annealed, oriented polymer-containing material to its orientation temperature, heat shrinkage is produced almost to the original dimensions, i.e., pre-elongation dimensions. Orienting in one direction is "uniaxial orientation" and in two directions is "biaxial orientation". In oriented plastic films, there can be internal stress remaining in the plastic sheet that can be relieved by reheating the film to a temperature above that at which it was oriented. Upon reheating such a film, the film tends to shrink back to the original dimensions it had before it was oriented. Films that shrink upon being heated are generally referred to as heat shrinkable films.

"Orientation ratio" refers to the multiplication product of the extent to which the plastic film material is oriented in several directions, usually two directions perpendicular to one another. Orientation in the machine direction is herein referred to as "drawing", whereas orientation in the transverse direction is herein referred to as "stretching". For films extruded through an annular die, stretching is obtained by "blowing" the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, also known as the "racking ratio". The ratio of the final film thickness to the original film thickness can be considered to be the orientation ratio.

In condensation polymers such as polyesters, comonomers combine by, for example, esterification or transesterification reactions with the elimination of water or low-molecular weight alcohols. Polyesters comprise repeat units derived from at least one alcohol and at least one dicarboxylic acid.

"Polymer" includes homopolymers or copolymers. "Copolymer" includes terpolymers, tetrapolymers, random copolymers, block copolymers, or graft copolymers. In general, the layers of a film can comprise or consist essentially of a single polymer, or can have additional polymers together therewith, i.e., blended therewith. Similarly, "polymerization" includes homopolymerizations, copolymerizations, terpolymerizations, etc., and all types of copolymerizations such as random, graft, block, etc. The polymers, in the films herein, can be produced by any suitable polymerization process, including slurry polymerization, gas phase polymerization, high pressure polymerization and solid phase polymerization processes.

As used herein, terms identifying polymers, such as "polyamide", "polyester", "polyurethane", etc., include polymers comprising repeat units derived from monomers known to polymerize to form a polymer of the named type, but are also inclusive of comonomers, derivatives, etc., which can be copolymerized with monomers known to polymerize to produce the named polymer. For example, the term "polyamide" encompasses both polymers comprising repeat units derived from monomers, such as caprolactam, which polymerize to form a polyamide, as well as copolymers derived from the copolymerization of caprolactam with a comonomer which when polymerized alone does not result in the formation of a polyamide. Terms identifying polymers also includes blends of such polymers with other polymers of a different type.

"Polyester" includes, for example, polyethylene terephthalate (PET), polypropylene terephthalate (PPT), polybutylene terephthalate (PBT), and blends with additional components such as modifiers and tougheners (for example PBT and/or PET blends). Preferred polyester composition comprises at least about 80 or at least about 90 weight % PET, either a homopolymer or copolymer of PET. The term "copolymer of PET" means any polymer comprising (or derived from) at least about 50 mole % PET and the remainder being derived from monomers other than terephthalic acid and ethylene glycol (or their ester forming equivalents). Other comonomers include for example diacids such as succinic acid, adipic acid, azelaic acid, sebacic acid, glutaric acid 1,10-decanedicarboxylic acid, phthalic acid, isophthalic acid, dodecanedioic acid, and the like; and ester forming equivalents thereof, diols such as propylene glycol, methoxypolyalkylene glycol, neopentyl glycol, trimethylene glycol, tetramethylene glycol, hexamethylene glycol, diethylene glycol, polyethylene glycol, cyclohexane dimethanol, and the like.

Tougheners include, but not limitation, ethylene copolymers such as ethylene/alkyl (meth)acrylate copolymers (e.g. ethylene/methyl acrylate), ethylene/alkyl acrylate/glycidyl (meth)acrylate copolymers and ethylene/acrylic acid copolymers (e.g. ethylene/n-butyl acrylate/glycidyl methacrylate), and ionomers thereof. Toughened polyesters can comprise from about 3 to about 20 weight % of tougheners.

The copolymer of polyester and a sulfobenzenedicarboxylic acid used herein includes any polymer comprising repeat units derived from sulfobenzenedicarboxylic acid (or its salt or ester). Other repeat units include terephthalic acid, dimethyl terephthalate and ethylene glycol in amounts such that the copolymer comprises at least about 50 mole % ethylene terephthalate, and the remainder of the polymer being derived from monomers comprising a sulfo (i.e. sulfonic acid) moiety, such as sulfoterephthalic acid or 5-sulfoisophthalic acid, their salts and/or ester forming equivalents thereof. The copolymer may be in the neutralized form (in the form of an alkali, alkali metal or metal salt). When in the salt form, these copolymers are also known as polyester ionomers, sulfonate polyesters or metal sulfonate polyesters. The term "sulfonic acid-containing polyester copolymer" denotes such copolymers, including the salt form. Suitable polyester ionomers are disclosed in U.S. Pat. Nos. 6,437,054 and 5,171,308, disclosures of which are incorporated herein by reference (certain sulfonated aliphatic-aromatic copolyesters incorporating 5 to 40 mole % of an aliphatic dicarboxylic acid, 1 to 30 mole % of glycol including diethylene glycol and triethylene glycol, 0.1 to 2.5 mole % of a sulfonate component, and 0 to 40 mole % of a hydroxy acid component). An example is 5-sulfoisophthalic acid; sodium salt of 5-sulfo-1,3-dimethyl ester 1,3-benzenedicarboxylic acid (also known as 5-sodium sulfodimethylisophthalate; CAS Registry No. 3965-55-7). The copolymer can have an inherent viscosity (IV) from 0.2 to 1.2, or 0.5 to 0.85.

Polyamide includes polyamide 6, polyamide 9, polyamide 10, polyamide 11, polyamide 12, polyamide 6,6, polyamide 6,10, polyamide 6,12, polyamide 6I, polyamide 6T, polyamide 6,9, as well as polyamides prepared from terephthalic acid and/or isophthalic acid and trimethylhexamethylenediamine; from adipic acid, azelaic acid, 2,2-bis-(p-aminocyclohexyl)propane, and from terephthalic acid and 4,4'-diaminocyclohexylmethane. Polyamide also includes mixtures and/or copolymers of two or more of the foregoing polyamides or prepolymers thereof, respectively.

Polyamides may be made by any known method, including the polymerization of a monoamino monocarboxylic acid or a lactam thereof having at least two carbon atoms between the amino group and carboxylic acid group, of substantially equimolar proportions of a diamine which contains at least two carbon atoms between the amino groups and a dicarboxylic acid, or of a monoaminocarboxylic acid or a lactam thereof as define above, together with substantially equimolar portions of a diamine and a dicarboxylic acid. This dicarboxylic acid may be used in the form of a functional derivative thereof, for example, a salt, an ester or acid chloride. A detailed description of polyamides and precursors thereof is disclosed in U.S. Pat. Nos. 4,755,566, 4,732,938, 4,659,760, and 4,315,086, each disclosure is incorporated herein by reference. The polyamide used may also be one or more of those referred to as "toughened nylons," which are often prepared by blending one or more polyamides with one or more polymeric or copolymeric elastomeric toughening agents. See, e.g., U.S. Pat. Nos. 4,174,358; 4,474,927; 4,346,194; 4,251,644; 3,884,882; and 4,147,740.

The polyamide can comprise polyamide 6, polyamide 9, polyamide 10, polyamide 11, polyamide 12, polyamide 6,6, polyamide 6,10, polyamide 6,12, polyamide 6I, polyamide 6T, polyamide 6,9, or copolymers of two or more thereof.

The polyamide layer can further comprise a polymer that retards the crystallization of the polyamide in the layer. This (crystallization-retarding) polymer comprises one or more polyolefins or another polyamide having a crystal structure different from the major polyamide in the polyamide layer of the multilayer film.

The polyamide layer may comprise another polymer that disrupts the crystallinity of the polyamide. The composition as disclosed immediately above facilitates orientation of a "tape" to get the resultant multilayer film. This is also preferred for orientation out of hot water.

The polyamide and polyester layers may provide adequate barriers to oxygen. At least one optional film layer may also serve as an additional $O_2$-barrier layer, and comprises ethylene vinyl alcohol copolymer (EVOH), polyamide, polyvinylidene chloride, polyalkylene carbonate, or combinations of two or more thereof. This $O_2$-barrier layer serves to layer impervious to atmospheric oxygen, which results in increasing the shelf life of the packaged product. EVOH also includes saponified or hydrolyzed ethylene vinyl acetate copolymers, and refers to a, EVOH having an ethylene comonomer (EVOH copolymers typically have from 27 to 44 mole % ethylene), and prepared by, for example, hydrolysis of vinyl acetate copolymers, or by chemical reactions with polyvinyl alcohol. The degree of hydrolysis can range from about 50 to about 100, or about 85 to about 100, mole %. EVOH is available under from Kuraray and under the trademark Noltex® from Nippon Goshei.

Appropriate amounts of various additives can be present in the respective polymeric compositions, and film layers thereof, including the presence of tie layers and the like. Additives can include antioxidants, radiation stabilizers, thermal stabilizers, and ultraviolet (UV) light stabilizers, pigments and dyes, fillers, delustrants, anti-slip agents, slip agents such as talc, plasticizers, anti-block agents, antistatic agents other processing aids, elastomers and the like.

"Inner layer" and "internal layer" refer to any layer, of a multilayer film, having both of its principal surfaces directly adhered to another layer of the film. "Inside layer" refers to an outer film layer, of a multilayer film packaging a product, which is closest to the product, relative to the other layers of the multilayer film and sometimes refers to the innermost layer of a plurality of concentrically arranged layers simultaneously coextruded through an annular die.

"Outer layer" refers to any film layer of film having less than two of its principal surfaces directly adhered to another layer of the film. All multilayer films have two, and only two, outer layers, each of which has a principal surface adhered to only one other layer of the multilayer film. "Outside layer" refers to the outer layer of a multilayer film packaging a product that is furthest from the product relative to the other layers of the multilayer film and can refer to the outermost layer of a plurality of concentrically arranged layers simultaneously coextruded through an annular die.

"Directly adhered" is adhesion of the subject film layer to the object film layer, without an intervening tie layer, adhesive layer, or other layer. In contrast, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more optional layers can be imposed between the subject layer and one or more of the layers the subject layer is between.

"Core" or "core layer" refers to any inner film layer which has a primary function other than serving as an adhesive or compatibilizer for adhering two layers to one another. The core layer or layers can provide the multilayer film with a desired level of strength, i.e., modulus, and/or optics, and/or added abuse resistance, and/or specific impermeability.

"Seal layer", "sealing layer", "heat seal layer", or "sealant layer" refers to an outer film layer, or layers, involved in the sealing of the film to itself, another film layer of the same or another film, and/or another article that is not a film. Up to the outer 3 mils of a film can be involved in the sealing of the film to itself or another layer. As to packages having only fin-type seals, as opposed to lap-type seals, "sealant layer" refers to the inside film layer of a package, as well as supporting layers within 3 mils of the inside surface of the sealant layer, the inside layer frequently also serving as a food contact layer in the packaging of foods. Sealant layers employed in the packaging art include thermoplastic polymers including polyolefin, polyamide, polyester, and polyvinyl chloride.

"Tie layer" refers to any inner film layer having the primary purpose of adhering two layers to one another. Tie layers can comprise any polymer having a polar group thereon, or any other polymer that provides sufficient interlayer adhesion to adjacent layers comprising otherwise non-adhering polymers.

"Bulk layer" refers to any layer of a film that is present for the purpose of increasing the abuse-resistance, toughness, modulus, etc., of a multilayer film. Bulk layers generally comprise polymers that are inexpensive relative to other polymers in the film that provide some specific purpose unrelated to abuse-resistance, modulus, etc.

The term "barrier" and the phrase "barrier layer", as applied to films and/or film layers, refers to the ability of a film or film layer to serve as a barrier to one or more gases. In the packaging art, oxygen (gaseous $O_2$) barrier layers include, for example, hydrolyzed or saponified ethylene/vinyl acetate copolymer ("EVOH" and "HEVA", and also referred to as "ethylene/vinyl alcohol copolymer"), polyalcohol ethers, polyvinylidene chloride (PVDC), polyamide, polyester, polyacrylonitrile wholly aromatic polyesters, resorcinol diacetic acid-based copolyesters, polyalcohol amines, isophthalate-containing polyesters, polyethylene naphthalate and its copolymers and mixtures thereof, etc., as known to those of skill in the art. These materials may be used neat or further modified to improve their physical properties including the addition of nanoparticles (to improve barrier properties), such as those available from Nanocor, Southern Clay Products, Rheox and others.

"Abuse layer" as well as the phrase "puncture-resistant layer" refers to an outer film layer and/or an inner film layer, so long as the film layer serves to resist abrasion, puncture, and other potential causes of reduction of package integrity, as well as potential causes of reduction of package appearance quality. "Skin layer" refers to an outside layer of a multilayer film in packaging a product, this skin layer being subject to abuse.

"Food-contact layer" or "meat-contact layer" refers to a layer of a multilayer film that is in direct contact with the food/meat in the package comprising the film. In a multilayer film, a food-contact layer is always an outer film layer, as the food-contact layer is in direct contact with the food product within the package. The food-contact layer is an inside layer that, with respect to the packaged food product, is the inside layer (i.e., innermost layer) of the package. "Food-contact surface" and "meat-contact surface" refer to an outer surface of a food contact layer, this outer surface being in direct contact with the food within the package.

In packages, the inside (innermost) layer of the package can serve as both the food-contact layer and the sealant layer.

"Meat-adhesion", "film-to-meat adhesion", "film-to-food adhesion" or "adhered" refers to maintaining direct contact between the meat surface and the meat-contact surface of the film, so that there is an absence of a substantial amount of free moisture (i.e., purge), which is water and juices emitted outside of the food/meat product. Free moisture may be present from 0 to about 2%, 0 to about 1%, 0 to 0.5%, or 0 to 0.01% based on the weight of the meat product before cooking.

"Meat pull-off" refers to that portion of a cook-in meat product that is torn off of the meat product upon stripping the cook-in film from the cooked meat product.

"Extrusion" is the process of forming continuous shapes by forcing a molten plastic material through a die, followed by cooling or chemical hardening. Immediately prior to extrusion through the die, the relatively high-viscosity polymer is fed into a rotating screw of variable pitch, i.e., an extruder, which forces the polymer through the die. "Coextrusion" refers to the process by which the outputs of two or more extruders are brought smoothly together in a feed block, to form a multilayer stream that is fed to a die to produce a layered extrudate. Coextrusion can be employed in film blowing, sheet and flat film extrusion, blow molding, and extrusion coating. Coextruded films are films prepared by coextrusion.

"Machine direction" (MD) refers to a direction "along the length" of the film, i.e., in the direction of the film as the film is formed during extrusion and/or coating. "Transverse direction" (TD) refers to a direction across the film, perpendicular to the machine or longitudinal direction.

"Free shrink" refers to the % dimensional change in a 10 cm×10 cm specimen of film, when shrunk at 185° F., with the quantitative determination being carried out according to ASTM D 2732, as set forth in the 1990 Annual Book of ASTM Standards, Vol. 08.02, pp. 368-371, which is incorporated, in its entirety, by reference hereto.

The multilayer film disclosed herein has at least 2 layers (preferably 2 to 20 layers) and preferably have at least 3 layers, or 3 to 12 layers, or from 3 to 11 layers, or from 3 to 8 layers. So long as the multilayer film has at least 2 layers, the multilayer film can have any further number of optional layers desired and have the desired properties for packaging operation in which the film is used, e.g., $O_2$-barrier characteristics, free shrink, shrink tension, optics, modulus, seal strength, etc.

A coextruded film is a multilayer polymeric sheet involving at least three categorical layers, including but not limited to, a base film layer, a structural or abuse layer, an optional barrier layer, an innermost sealant layer and optionally one or more adhesive or tie layers there between. In some cases, a composition may be suitable to function as one or more categorical layers. In those cases, a single layer of polymer composition may fulfill the role of one or more categorical layers. For example, a single polyamide layer may fulfill the roles of both structural or abuse layer and barrier layer. A polyester layer may fulfill the roles of both base layer and sealant layer.

The multilayer film can have any total thickness desired to provide the desired properties for the particular packaging operation in which the film is used such as a total thickness (a combined thickness of all layers) of from about 0.3 to about 15 mils (1 mil equals 0.001 inch=0.00254 cm), about 1 to about 10 mils, or 1.5 to 8 mils. For shrinkable bags, the range can be from 1.5-3 mils and for non-shrinkable articles, the range can be from 4-8 mils. The $O_2$-barrier layer may have a thickness of about 0.05 to 5 mils, 0.05 to 0.5 mil, 0.1 to 0.3 mil, or about 0.12 to 0.17 mils.

Multiple film layers provide the multilayer film with the desired abuse, shrink, and optical characteristics. In some cases, structure, abuse or bulking layers may be present. Such layers can comprise polymers having relatively low cost while providing these characteristics. These layers can comprise polyamide, polyester, or both.

Polyester-based copolymers may serve as tie layers, having a relatively high degree of compatibility with the polyester and polyamide layers and any optional barrier layers, such as polymerized EVOH. A tie layer may comprise the sulfonic acid or its derivative-containing polyester copolymers.

The multilayer film can be produced by coextrusion. Orientation (either uniaxially or biaxially) can be effected by various methodologies (e.g., blown film, mechanical stretching or the like).

Coextrusion can be carried out according to any known coextrusion methods. For example, a film can be manufactured by extrusion using so-called "blown film" or "flat die" methods. A blown film is prepared by coextruding the individual polymeric compositions through an annular die such that a seamless, tubular multilayer film having concentric layers of the compositions is prepared. Expanding the resulting tubular film with an air current provides a blown film. Cast flat films are prepared by coextruding the individual compositions through a flat die to provide a laminar flow of the layered compositions. The molten laminar flow leaving the die is cooled by at least one roll containing internally circulating fluid (a chill roll) or by a water bath to provide a cast film. The film can be sized by conventional techniques such as slitting to provide a packaging film. A film disclosed may have a width of about 25 to 60 cm (about one to two feet).

A film disclosed here can be further oriented beyond the immediate quenching or casting of the film, by extruding a laminar flow of molten polymer to produce an extrudate, quenching the extrudate and orienting the quenched extrudate in at least one or more directions. "Quenched" describes an extrudate that has been substantially cooled below its melting point in order to obtain a solid film material.

The film can be unoriented, oriented in a uniaxial direction (e.g. machine direction), or oriented in a biaxial direction (e.g. machine direction and transverse direction). The film may be biaxially oriented by drawing in two mutually perpendicular directions in the plane of the film to achieve a satisfactory combination of mechanical and physical properties.

Orientation and stretching apparatus to uniaxially or biaxially stretch film are known in the art and may be adapted by those skilled in the art to produce films of the present invention. See, e.g., apparatus and processes disclosed in U.S. Pat. Nos. 3,278,663; 3,337,665; 3,456,044; 4,590,106; 4,760,116; 4,769,421; 4,797,235 and 4,886,634.

A blown film may be oriented using a double bubble extrusion process, where simultaneous biaxial orientation may be effected by extruding a primary tube which is subsequently quenched, reheated and then expanded by internal gas pressure to induce transverse orientation, and drawn by differential speed nip or conveying rollers at a rate which will induce longitudinal orientation.

An oriented blown film may be made by any methods known in the art such as disclosed in U.S. Pat. No. 3,456,044. A primary tube may be melt extruded from an annular die. This extruded primary tube is cooled quickly to minimize crystallization. It is then heated to its orientation temperature (for example, by means of a water bath). In the orientation zone of the film fabrication unit a secondary tube is formed by inflation, thereby the film is radially expanded in the transverse direction and pulled or stretched in the machine direction at a temperature such that expansion occurs in both directions, preferably simultaneously; the expansion of the tubing being accompanied by a sharp, sudden reduction of thickness at the draw point. The tubular film is then again flattened through nip rolls. The film may be reinflated and passed through an annealing step (thermofixation), during which step it is heated once more to adjust the shrink properties.

The film may be formed by an extrusion process that causes the polymer chains in the film to be generally aligned in the direction of extrusion. Linear polymers, after being highly oriented uniaxially possess considerable strength in the orientation direction, but less strength in the transverse direction. This alignment may add strength to the film in the direction of extrusion.

The multilayer film may have a free shrink of from about 5 to about 70% in one or both directions (i.e longitudinal direction "L", also referred to as "machine direction", and transverse direction, "T", at 185° F., determined according to ASTM D 2732-83); more preferably, from about 10 to about 50% at 185° F.; still more preferably, from about 15 to about 35% at 185° F. Preferably, the multilayer film is biaxially oriented.

The multilayer film may be oriented and then heatset or annealed. The multilayer film preferably has a transverse direction free shrink of about 0 to 20% at 185° F. or about 2 to 10%.

The films are further defined as being biaxially oriented so that they have less than about 20% shrink or less than about 5% shrink.

Certain packaging operations involve the use of a heat-shrinkable bag to package and cook a turkey product. In these applications, it is often desirable to obtain a product after cooking which has a profile similar to a turkey-breast. It may be desirable to obtain a high a level of shrink tension in order to achieve the proper shape. The presence of the second layer of the multilayer film helps provide the multilayer shrink film with the desired shrink and shrink tension characteristics in order to achieve the proper product profile after cooking.

The invention includes an article comprising a multilayer film comprising (a) at least one layer comprising a polyester (e.g., PET) blended with a copolymer of polyester and a sulfobenzenedicarboxylic acid (a sulfonic acid-containing polyester copolymer; e.g., copolymer derived from ethylene glycol, terephthalic acid and 5-sulfoisophthalic acid); (b) at least one polyamide layer; and optionally (c) at least one optional layer that serves as an oxygen barrier layer. Blend ratios can be from 1 to 99 or from 2 to 49 weight % sulfoisophthalic acid copolymer. Examples include a two-layer structure consisting of a first layer comprising a blend of polyester and a sulfonic acid-containing polyester copolymer and a second layer comprising polyamide. Either the first or the second layer may serve as the food-contact/sealant layer.

Also an example is a three-layer structure consisting of a first layer comprising a blend of polyester and a sulfonic acid-containing polyester copolymer, a second layer comprising polyamide, and a third layer comprising a blend of polyester and a sulfonic acid-containing polyester copolymer. Either the first or the third layer may serve as the food-contact/sealant layer.

Also an example is a four-layer structure consisting of a first layer comprising a blend of polyester and a sulfonic acid-containing polyester copolymer, a second layer comprising polyamide, a third layer comprising an EVOH layer as a barrier layer, and a fourth layer comprising polyamide. Either the first or the fourth layer may serve as the food-contact/sealant layer.

Another example is a five-layer structure consisting of a first layer comprising a blend of polyester and a sulfonic acid-containing polyester copolymer, a second layer comprising polyamide, a third layer comprising an EVOH barrier layer, a fourth layer comprising polyamide, and a fifth layer comprising a blend of polyester and a sulfonic acid-containing polyester copolymer. Either the first or the fifth layer may serve as the food-contact/sealant layer.

The layer(s) comprising a sulfonic acid-containing polyester copolymer serve as tie layer(s) in the multilayer structure.

An example is a three-layer structure consisting of a first layer comprising polyester; a second layer comprising a sulfonic acid-containing polyester copolymer; and a third layer comprising polyamide. Either the first or the third layer can serve as the food-contact/sealant layer.

Another example is a four-layer structure consisting of a first layer comprising polyester; a second layer comprising a sulfonic acid-containing polyester copolymer; a third layer comprising polyamide; and a fourth layer comprising polyamide. Either the first or the fourth layer can serve as the food-contact/sealant layer.

Another example is a five-layer structure consisting of a first layer comprising polyester; a second layer comprising a sulfonic acid-containing polyester copolymer; a third layer comprising polyamide, a fourth layer comprising an EVOH layer as a barrier layer, and a fifth layer comprising polyamide. Either the first or the fifth layer can serve as the food-contact/sealant layer.

Another example is a five-layer structure consisting of a first layer comprising polyester; a second layer comprising a sulfonic acid-containing polyester copolymer; a third layer comprising polyamide, a fourth layer comprising a sulfonic acid-containing polyester copolymer; and a fifth layer comprising polyester. Either the first or the fifth layer can serve as the food-contact/sealant layer.

Another example is a seven-layer structure consisting of a first layer comprising polyester; a second layer comprising a sulfonic acid-containing polyester copolymer; a third layer comprising polyamide; a fourth layer comprising an EVOH layer as a barrier layer; a fifth layer comprising polyamide; a sixth layer comprising a sulfonic acid-containing polyester copolymer; and a seventh layer comprising polyester. Either the first or the seventh layer can serve as the food-contact/sealant layer.

Vent areas may be made anywhere on the package simply by providing a slit in the package face at the time of heating.

A package may be prepared from a multilayer film without opening or slitting for venting prior to cooking (i.e. "self-venting"). This may allow for an atmosphere exchange and promotes browning of the foodstuff being cooked. At the same time the foodstuff rests in the package and cooks in the natural juices that are exuded. This may keep the foodstuff moist, tender and tasty and also can speed cook time. A package may be made self-venting by incorporating a tie layer comprising a composition that will soften and rupture between 250° F. and 450° F. (about 120 and about 235° C.), or about 300° F. (about 150° C.), next to the food-contact layer. On heating the package above 250° F. in an oven, the temperature-dependent tie layer fails and the multilayer structure delaminates. The food-contact layer may not be supported by the rest of the multilayer structure and can rupture because of the internal pressure resulting from cooking the foodstuff, allowing contact with the atmosphere around the package.

Tie layers used in providing a temperature-dependent self-venting feature include blends of ethylene/maleic anhydride graft copolymers with ethylene/methyl acrylate copolymers.

An example of a self-venting package comprises a seven-layer film structure consisting of a first layer comprising polyester; a second layer comprising a sulfonic acid-containing polyester copolymer; a third layer comprising polyamide; a fourth layer comprising an EVOH layer as a barrier layer; a fifth layer comprising polyamide; a sixth layer comprising a blend of an ethylene/maleic anhydride graft copolymer with an ethylene/methyl acrylate copolymer; and a seventh layer comprising polyester. The sixth layer can be the self-venting temperature-dependent tie layer and the seventh layer can be the food-contact/sealant layer.

Films may be printable to provide the consumer with product information, cooking instructions, and the like and/or to provide a pleasing appearance to the package prepared from the film.

The package can be cooked in directly due to the material construction providing the convenience of being able to purchase a fresh, frozen, partially cooked or value-added foodstuff in a package at the retail level and be able to insert the package containing the foodstuff directly into a conventional, convection or microwave oven and cook in the package is unique. Removing the foodstuff from the package and transfer it to another container for cooking can be eliminated. "Value-added foodstuff" describes a foodstuff that has some additional preparation elements provided before packaging. For example, a value-added foodstuff comprises at least one food portion and additional components such as seasonings, sauces, marinades and the like. It may also comprise a mixture of different food components such as a meat portion and at least one vegetable portion that provides a meal.

Examples of foodstuffs that may be packaged in packages of this invention include processed meats such as sausages, hot dogs and the like. Other examples include cooked meat product such as poultry, pork (including ham), roast beef, liver, sausage, mortadella, bologna, goat, and lamb. The cooked meat product can comprise poultry, ham, or roast beef. The foodstuffs also include value-added, seasoned, marinated and/or precooked meat products or prepared meals. The foodstuffs may also be whole-muscle and/or bone-in meat and poultry portions such as, for example but not limitation, pork loin, comprises pork, boneless ham, turkey or chicken breasts and the like. Poultry also includes ready-to-cook or pre-cooked whole birds. "Ham" or "ham products" includes ham with natural juices, ham with water added, and, ham-and-water product. The ham with natural juices comprises at least 17½% protein fat-free, while the ham with water added comprises at least 16% protein fat-free.

The ham-and-water product, on the other hand, comprises at least 16% protein fat-free, but also comprises added ingredients in an amount of about 35 weight %, based on the weight of the product. Because of relatively high percentage of added ingredients in the ham-and-water product, it may be difficult to obtain adequate film-to-meat adhesion to the ham-and-water product than to the other above-identified ham products. The above description of ham products are known to those of skill in the art, and moreover, are disclosed in the Encyclopedia of Labeling Meat and Poultry Products, Eighth Edition, Meat Plant Magazine, St. Louis, Mo.

Packages may also be used to package fresh meat, poultry and seafood in modified atmospheric packaging applications or vacuum packaging applications. The barrier features combined with a sealant that can seal through contamination can provide greater economic benefit due to reducing the materials and labor in fresh product packaging operations. Such packages are ovenable as described herein, and may become self-venting once the internal temperature and pressure reach the softening point of the sealant.

Packages may incorporate other features such as perforations, tear zones and the like that facilitate opening the package. Polyamide and PET combinations provide directional tear properties in that a pre-notched package may be torn open in a straight line in either the machine direction or transverse directions. These tear properties allow for great flexibility in package configuration and design. Thus, the opening area to access the foodstuff after heating is not limited to a particular part (e.g., the top) of the package. This allows for strategically locating a notch at the side of the package in the desired area for opening.

The packaged product may be made by a process comprising (A) filling an article (the article being a bag, casing, pouch, etc.) with a meat product; (B) closing the open end of the filled article so that the meat product is encased by the closed article; and optionally (C) cooking the meat product encased in the closed article by subjecting the meat to cook-in, so that the meat product adheres to the inside surface of the closed article. The packaged product may be refrigerated and/or frozen and subsequently reheated, cooked, and the like inside the package by the consumer prior to consumption. The article used for the packaged product is an article disclosed above.

The following Examples are merely illustrative and are not to be construed as limiting the scope of the invention. Unless stated otherwise, all percentages, parts, etc., are by weight.

EXAMPLES

Materials Used

PET-1: Toughened PET, available under the tradename Crystar® 5005 from E. I. du Pont de Nemours and Company (DuPont), Wilmington, Del.

PET-2: PET, available under the tradename Crystar® 4462 from DuPont, Wilmington, Del.

PET-3: Low heat-seal initiation temperature PET copolymer, available under the tradename Crystar® 4446 from DuPont.

SPET-1: A 1.7 weight % sulfobenzenedicarboxylic acid-PET copolymer, neutralized with sodium.

PA-1: Nylon 6.

PA-2: Amorphous nylon 6I,6T, available under the tradename Selar® PA from DuPont, Wilmington, Del.

PA-3: Nylon MXD-6, available under the tradename MXD-6 6007 from Mitsubishi.

AEMA-1: Anhydride-modified ethylene/methyl acrylate copolymer, available under the tradename Bynel® 21 E810 from DuPont.

EVOH-1: 32 mole % ethylene vinyl alcohol copolymer.

An eighteen-inch wide, 3-mil thick, coextruded flat film was produced by casting on a chilled drum under standard cast-film forming conditions to prepare a film of Example 1. The tie layers were about 0.1 to 0.3 mils thick and the polyamide layer was about 0.5 mils thick. Examples 2 through 6 were prepared similarly. Example 4 was designed to be self-venting when heated in an oven above 250° F. by the use of the AEMA-1 tie layer. The cross-section of each film was reported in Table 1, wherein "/" indicates a boundary between layers.

TABLE 1

| Example | Cross-section |
|---|---|
| 1 | PET-1/SPET-1/PA-1 + PA-2 (70/30 blend)/SPET-1/PET-1 |
| 2 | PET-1/SPET-1 + PET-1 (50/50 blend)/PA-1/PA-3/PA-1/SPET-1 + PET-1 (50/50 blend) |
| 3 | PET-1/SPET-1/PA-1 + PA-2 (70/30 blend)/SPET-1/PET-3 |
| 4 | PET-1/SPET-1/PA-1 + PA-2 (70/30 blend)/AEMA-1/PET-1 |
| 5 | PA-1/PA-2/SPET-1 + PET-1 (50/50 blend) |
| 6 | PET-1/SPET-1 + PET-1 (50/50 blend)/PA-1/EVOH-1/PA-1/SPET-1 + PET-1 (50/50 blend) |

Sixteen-inch wide (lay flat dimension) multilayer blown film tubes, called "tapes", were produced by the blown film coextrusion process under standard conditions, wherein the tape cross-section (from outside of tube to inside of tube) of each is reported in Table 2.

TABLE 2

| Example | Cross-section |
|---|---|
| 7 | PET-2/SPET-1/PA-1 + PA-2 (70/30 blend)/SPET-1/PET-2 |
| 8 | PET-2/SPET-1 + PET-2 (50/50 blend)/PA-1/PA-3/PA-1/SPET-1 + PET-2 (50/50 blend) |
| 9 | PET-2/SPET-1/PA-1 + PA-2 (70/30 blend)/SPET-1/PET-3 |
| 10 | PET-2/SPET-1/PA-1 + PA-2 (70/30 blend)/AEMA-1/PET-2 |
| 11 | PA-1/PA-2/SPET-1 + PET-2 (50/50 blend) |
| 12 | PET-2/SPET-1 + PET-1 (50/50 blend)/PA-1/EVOH-1/PA-1/SPET-1 + PET-1 (50/50 blend) |

Bags were made from the oriented tubing under a preferred set of conditions by making a transverse heat seal across the width of the tubing and then severing the tubing parallel to and immediately behind the seal.

Foodstuffs may be placed in the bag and the open end sealed by a transverse heat seal across the width of the tubing.

In Example 13, an eighteen-inch wide, 15-mil thick, coextruded flat sheet was produced by casting on a chilled drum under standard cast-sheet forming conditions. The tie layers were about 0.3 to 0.5 mils thick and the polyamide layer was about 2.0 mils thick. This sheet was suitable as a thermoformable web to prepare a pouch for containing a food product.

The sheet was thermoformed under standard forming conditions to form a cavity appropriately sized to hold a foodstuff (for example, a turkey breast).

A lidding film, of the construction reported for Example 1, was placed over the thermoformed web and heat sealed to the web, thereby enclosing the foodstuff.

The invention claimed is:

1. An article comprising a coextruded multilayer film wherein the film comprises a sulfonic acid-containing polyester layer in direct contact with a polyamide layer and with a sealant layer, the film optionally also comprising a barrier layer;

wherein the sulfonic acid-containing polyester is a sulfonic acid-containing copolymer consisting of units of sulfobenzenedicarboxylic acid, terephthalic acid, optionally other diacids selected from the group consisting of succinic acid, adipic acid, azelaic acid, sebacic acid, glutaric acid, 1,10-decanedicarboxylic acid, phthalic acid, isophthalic acid and dodecanedioic acid, ethylene glycol and optionally one or more other diols selected from the group consisting of propylene glycol, methoxypolyalkylene glycol, neopentyl glycol, trimethylene glycol, tetramethylene glycol, hexamethylene glycol, diethylene glycol, polyethylene glycol and cyclohexane dimethanol, or a blend of a polyester and the sulfonic acid-containing copolymer;

the polyester in the blend is polyethylene terephthalate, polypropylene terephthalate, polybutylene terephthalate, or combinations of two or more thereof;

the sulfobenzenedicarboxylic acid is sulfobenzenedicarboxylic acid, a salt of the acid, an ester of the acid, an ester of the salt of the acid, or combinations of two or more thereof; and the barrier layer is at least one polymer including ethylene/vinyl alcohol copolymer, polyamide, polyvinylidene chloride, polyalkylene carbonate, or combinations of two or more thereof;

wherein the sulfonic acid-containing polyester comprises from 0.01 to 5 mol % of the sulfobenzenedicarboxylic acid, and wherein the film can withstand submersion in water at 100° C. for 12 hours;

the sealant layer is an outer layer and is polyester having a Tg below 65° C.;

the film has a free shrink at 185° F. of at least 10% in one or both of the machine and transverse directions; and the film can withstand exposure to cooking conditions at 425° F. for 3 hours.

2. The article of claim 1 wherein the sulfonic acid-containing polyester comprises from 0.05 to 2.5 mol % of the sulfobenzenedicarboxylic acid.

3. The article of claim 2 wherein the sulfobenzenedicarboxylic acid is an alkali metal salt of the sulfobenzenedicarboxylic acid, an alkaline earth metal salt of the sulfobenzenedicarboxylic acid, or combinations thereof.

4. The article of claim 3 wherein the salt is calcium salt, sodium salt, lithium salt, or combinations of two or more thereof and the polyamide is polyamide 6, polyamide 9, polyamide 10, polyamide 11, polyamide 12, polyamide 66, polyamide 6,10, polyamide MXD6, polyamide 6,12, polyamide 6I, polyamide 6T, polyamide 6I,6T, polyamide, polyamide 6,9, polyamide copolymer, a nanocomposite of one or more of the preceding polyamides, or combinations of two or more thereof.

5. The article of claim 1 wherein the sulfonic acid-containing polyester is the blend.

6. The article of claim 5 wherein the polyamide comprises about 40 to 90 weight % of polyamide 6 or polyamide 6,6 and an aromatic polyamide; and the aromatic polyamide comprises polyamide 6I,6T, polyamide MXD6, or combinations thereof.

7. The article of claim 6 wherein the polyamide is a nanocomposite.

8. The article of claim 1 wherein the polyamide comprises amorphous polyamide, semicrystalline polyamide, or combinations thereof; the film comprises the barrier layer.

9. The article of claim 1 further comprising another layer that comprises repeat units derived from the sulfobenzenedicarboxylic acid or its salt and the salt is alkali metal salt, alkaline earth metal salt, or both.

10. The article of claim 9 wherein the another layer is in contact with the polyamide layer and the film has the structure of sealant layer/sulfonic acid-containing polyester layer/polyamide layer/another layer.

11. The article of claim 10 wherein the polyamide is a blend of two or more polyamides.

12. The article of claim 11 wherein the polyamide is a blend of about 40 to 90 weight % of polyamide 6 or polyamide 6,6 and an aromatic polyamide.

13. The article of claim 1 wherein the film is printable.

14. A self-venting article comprising or produced from the article according to claim 1, wherein the film further comprises a tie layer between one or more layers of the film; the tie layer ruptures between about 120° C. and about 235° C.; and the tie layer is (1) a blend comprising an ethylene/maleic anhydride graft copolymer and an ethylene/methyl acrylate copolymer or (2) a blend of polyester and the sulfonic acid-containing copolymer.

15. The self-venting article of claim 14 wherein the tie layer softens below about 150° C.

16. The self-venting article of claim 15 wherein the tie layer comprises the blend of the ethylene/maleic anhydride graft copolymer and the ethylene/methyl acrylate copolymer.

17. The self-venting article of claim 16 wherein the article is an end-seal bag, a side-seal bag, or a thermoformed pouch with a lidding film.

18. The self-venting article of claim 15 wherein the tie layer comprises the blend of the polyester and the sulfonic acid-containing copolymer.

19. The self-venting article of claim 15 wherein the polyamide layer comprises or is produced from a nanocomposite.

20. The self-venting article of claim 14 wherein the self-venting article is a package comprising a foodstuff.

21. The article of claim 1 wherein the film is
(1) a three-layer structure in which a first layer is polyester, a second layer is the sulfonic acid-containing polyester and a third layer is polyamide;
(2) a four-layer structure in which a first layer is polyester; a second layer is the sulfonic acid-containing polyester, a third layer is polyamide and a fourth layer is polyamide;
(3) a five-layer structure in which a first layer comprising polyester, a second layer is the sulfonic acid-containing polyester, a third layer is polyamide, a fourth layer is ethylene vinyl alcohol copolymer and a fifth layer is polyamide;
(4) a five-layer structure in which a first layer is polyester, a second layer is the sulfonic acid-containing polyester, a third layer is polyamide, a fourth layer is the sulfonic acid-containing polyester and a fifth layer is polyester; or
(5) a seven-layer structure in which a first layer is polyester, a second layer is the sulfonic acid-containing polyester, a third layer is polyamide, a fourth layer is ethylene vinyl alcohol copolymer, a fifth layer is polyamide, a sixth layer is the sulfonic acid-containing polyester and a seventh layer is polyester.

* * * * *